(No Model.) 3 Sheets—Sheet 2.

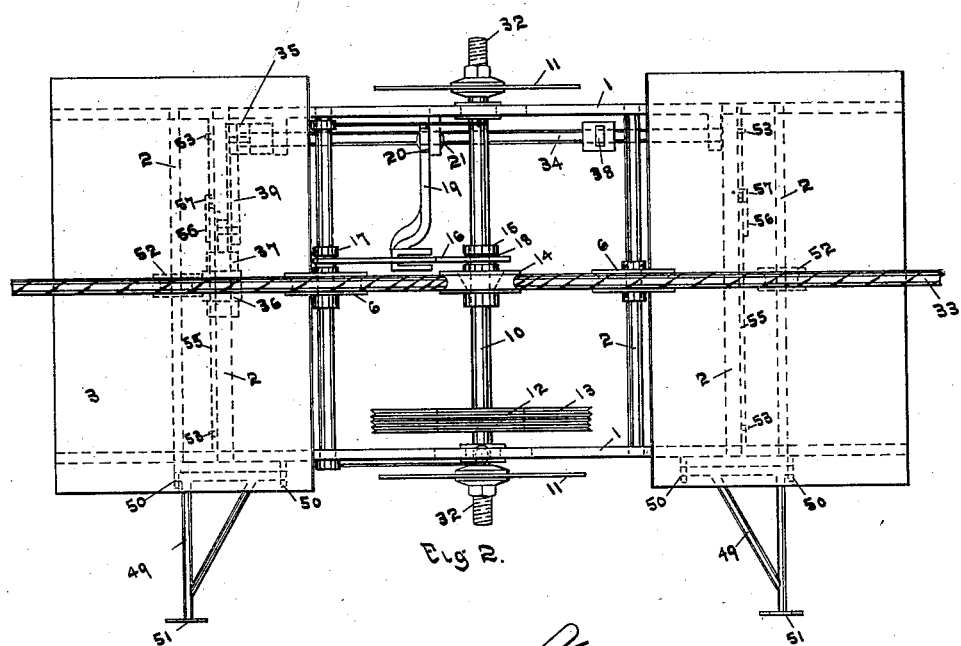

S. W. BAKER & P. FRITCH.
ICE CUTTING MACHINE.

No. 393,807. Patented Dec. 4, 1888.

Witnesses:
Geo. A. Stone.
M. E. Robinson.

Inventors
Seward W. Baker,
Philip Fritch.
By
Risley Quin & Perry.
Attorneys.

(No Model.) 3 Sheets—Sheet 3.
S. W. BAKER & P. FRITCH.
ICE CUTTING MACHINE.
No. 393,807. Patented Dec. 4, 1888.
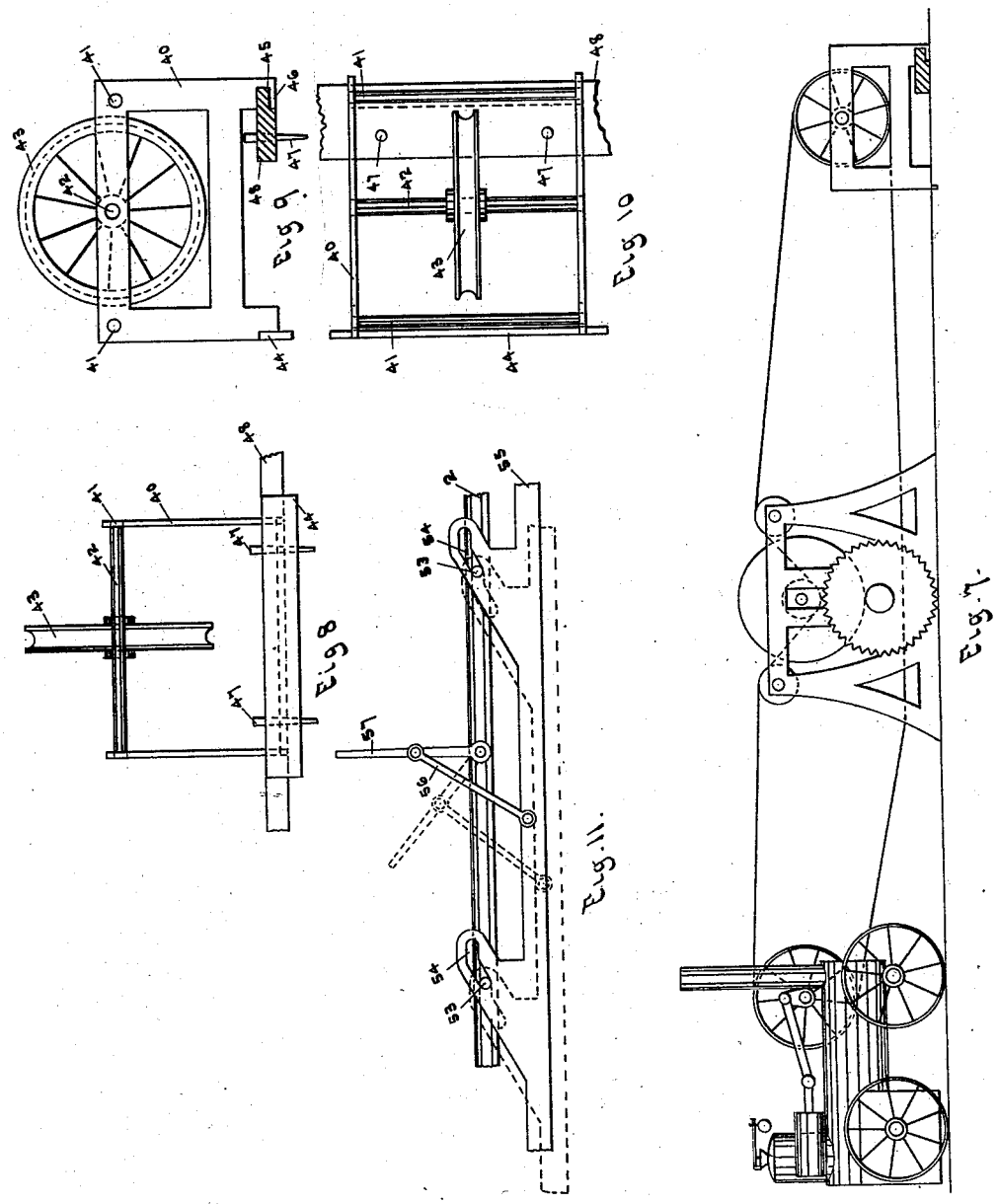
Witnesses:
W. A. Stow.
M. E. Robinson
Inventors:
Seward W. Baker.
Philip Fritch.
By
Ashley Quinn + Perry
Attorneys.

UNITED STATES PATENT OFFICE.

SEWARD W. BAKER AND PHILIP FRITCH, OF ORISKANY, NEW YORK.

ICE-CUTTING MACHINE.

SPECIFICATION forming part of Letters Patent No. 393,807, dated December 4, 1888.

Application filed June 25, 1887. Serial No. 242,444. (No model.)

*To all whom it may concern:*

Be it known that we, SEWARD W. BAKER and PHILIP FRITCH, of the village of Oriskany, in the county of Oneida and State of New York, have invented certain new and useful Improvements in Ice-Cutting Machines; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to a machine for cutting ice; and it consists in the mechanism and construction hereinafter pointed out, described, and claimed.

Figure 3:
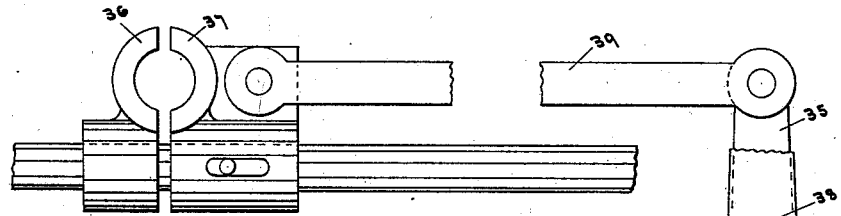
Figure 4:
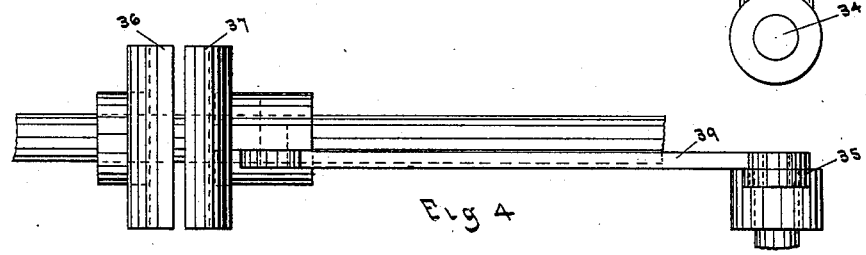
Figure 5:
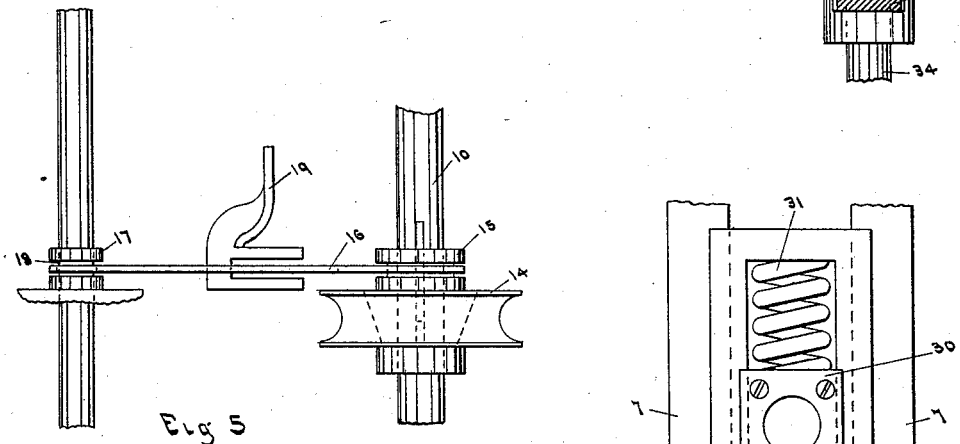
Figure 6:
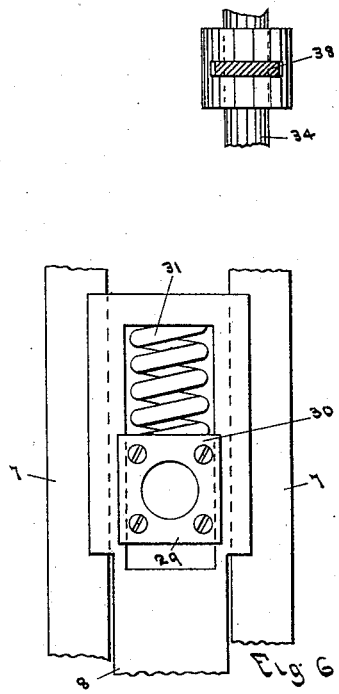

In the drawings herewith presented, Figure 1 represents a side elevation of our machine. Fig. 2 represents a plan view of the same. Figs. 3 and 4 represent, respectively, a side elevation and plan view of the cable-gripping device used on our machine, and which will be hereinafter described. Fig. 5 represents a plan view of the friction-clutch and part of its actuating mechanism as employed by us on our machine, and which will be described later on. Fig. 6 represents a side elevation of the spring journal-box as used by us, and which will be hereinafter described and explained. Fig. 7 represents a view in side elevation of our complete device, consisting of the steam-engine, the ice-cutting machine proper, and the idler-stand carrying the pulley, over which the cable passes. Figs. 8 and 9 represent, respectively, front and side elevations of the idler-stand; and Fig. 10 represents a plan view of the same. Fig. 11 represents a side elevation of the mechanism for permitting lateral movement of our machine, as will be hereinafter described.

Like figures of reference refer to like parts in the several views presented.

Referring specifically to the drawings in describing our invention, 1, Figs. 1 and 2, represents the side frames of our machine. These are held and tied rigidly together by the connecting distance rods or shafts 2. Other tie rods or braces may be used, if required, the side frames, 1, and the tie-bars constituting the saw-frame of the machine, and also a frame upon which the snow-scrapers are mounted.

Upon each end of the frame 1 are mounted the curved metallic plates 3. These plates have attached to and projecting therefrom slotted ears 4. Bolts 5 are introduced into slots 4 and into the sides of the frame 1, and furnish a means whereby the plate 3 can be approximately vertically adjusted and held in any desired position. Journaled upon rods 2, in such manner as to be free to rotate thereon, are the ropes, sheaves, or pulleys 6. These are held against lateral displacement by proper guard-collars, or any other appropriate means.

It will be noticed that frame 1 is so constructed as to provide two vertical bars or guides near its center, as shown at 7, Figs. 1 and 6. Arranged between the vertical guides 7 and gibbed or otherwise secured therein in such manner as to admit of free vertical movement and at the same time guard against lateral displacement is what we term a "double journal-box," 8. (A portion of this is shown in Fig. 6.) This is an approximately rectangular structure of metal, having journal-boxes at each end for the reception of the saw shaft or arbor 9 and the main driving-shaft 10. The saw-shaft 9 has mounted, in the usual manner, at each end thereof the saws 11, and has also properly and rigidly mounted thereon the grooved-faced friction-pulley 12. The main shaft 10 also carries, rigidly mounted thereon, the larger grooved-faced friction-pulley 13. These friction-pulleys engage each other and communicate rotary motion from the main shaft 10 to the saw-shaft 9. Shafts 9 and 10 are free to rotate, but are held against lateral movement by any known mechanical means. Shaft 10 also has loosely mounted thereon the rope sheave or pulley 14. This pulley has a conical hole through its center larger in diameter than the shaft 10. Splined or feathered upon shaft 10 in such manner as to partake of its rotary movement, and also to admit of lateral movement within certain limits, is the sleeve or bush 15. This sleeve has a conical end corresponding in size to that of the conical hole in pulley 14. This bush, when entered into the pulley and firmly held, forms a friction-clutch and causes any movement of the pulley to be communicated to shaft 10. Retracting the bush disengages the same from the pulley and permits it (the pulley) to rotate independently of the shaft upon which it is mounted. While we describe and illustrate a friction-clutch in this connection, we reserve the right to use a positive clutch should such prove desirable. The bush 15 is actuated by the lever 16, which is fulcrumed at one end upon the grooved collar 17, while its other or forked end engages the circumferential groove 18 in bush 15. Lever 16 is engaged by the forked end of a projecting arm, 19, which projects at approximately right angles from the actuating-lever 20. Lever 20 is pivoted at its lower end, as shown at 21, to a lug projecting from the frame 1. Its upper or free end is provided with an appropriate handle. It will be readily seen that operating-lever 20 will engage or disengage the bush 15 from the rope-sheave 14.

As has been previously observed, the double journal-boxes carrying shafts 9 and 10 are vertically adjustable in the frame 1, and the mechanism for accomplishing such vertical adjustment is described as follows: Pivoted to the double journal-boxes 8 at an appropriate point is the link 22. (This link is shown broken out in Fig. 1 to better show other parts of the machine.) This link is pivoted at its upper end to the lever 23. This lever 23 is rigidly attached at its other end to a shaft, 24, that is journaled in and extends across the frame 1, where the same link-and-lever arrangement previously described is duplicated. The lever 23 has pivoted to it and connecting it with lever 25, to which it is pivoted, the link 26. Lever 25 is fulcrumed at its lower end in lug 27, which is attached to and projects from frame 1, while the outer and upper end terminates in an appropriate handle, and is provided with an ordinary "duck's-bill" spring-latch, which engages the notched sector 28. To avoid unnecessary complication in the drawings, lever 25 and notched sector 28 are not shown in Fig. 2. Movement of lever 25 either raises or lowers the double journal-boxes 8 and the shafts, saws, &c., connected therewith. Some arrangement is evidently necessary to keep the friction-pulleys 12 and 13 in contact and automatically compensate for any wear of the contacting grooved faces thereof. This is provided for by the arrangement shown in detail in Fig. 6. The upper end of the upper journal-box, 8, is longitudinally slotted, and into this slot is introduced the journal-box 29. Box 29 is so fitted in the slot as to freely move vertically therein, and is secured against lateral displacement by cheek-pieces 30, or any other well-known mechanical device. Between the upper end of the slot and the upper end of box 29 is placed a coiled spring, 31, or its equivalent. When the parts are in their normal condition, the spring is in a state of compression; consequently any wear of the faces of the friction-pulleys will be taken up and compensated for by the downward pressure of the coiled spring 31.

It will be observed that the saw-shaft projects farther than usual outside of the saws, and is screw-threaded, as shown at 32, Fig. 2. This is done to allow the saws to be placed farther apart than shown, if desirable. In attaching the saws to the shaft the usual stationary and movable collars and nuts are used, so if it is desirable to place the saws farther apart the nuts, loose collars, and saws are removed from the shaft and loose collars of suitable thickness are slipped against the stationary collars, when the saws, loose collars, and nuts are replaced.

In certain stages of the operation of our machine it is desirable to connect the cable, portions of which are shown at 33, Figs. 1 and 2, firmly with the frame-work of the machine. To accomplish this end we provide gripping mechanism, which is described as follows: Lying horizontally along the inside of the bottom of one of the sides of our machine, and journaled in proper lugs or bearings projecting therefrom, is a shaft, 34, Figs. 1, 2, 3, and 4. This shaft has rigidly attached thereto at one end the crank-arm 35. Mounted upon that tie-rod 2 nearest the crank-arm 35 is what we term a "gripping-sleeve." This consists of two parts. One of these parts, as shown at 36, is rigidly attached to the shaft or tie-rod 2. The other part, 37, is so arranged as to be movable longitudinally within certain limits upon the rod 2, but is secured against rotary movement around the rod by slot and pin or any other appropriate means. The cable 33 passes freely through between the opposing concave faces of parts 36 and 37 when they are in the position shown. Shaft 34 has rigidly attached thereto and projecting upwardly therefrom a lever or handle, 38. The crank-arm 35 has pivoted to it and connecting with part 37 to which it (the link) is pivoted the link 39. Operating-lever 38 consequently either increases or diminishes the distance between parts 36 and 37 of the gripping-sleeve. When the parts are close together, they firmly grip the inclosed cable and hold the same. The concave faces of parts 36 and 37 may be corrugated, if desired, to give them greater gripping and holding power.

As the device consisting of frame 1 and its attached parts is intended to travel or slide upon the surface of the ice, some means must be provided for compelling it to travel in a straight line. To do this we provide the hinged guides 49. These consist of approximately triangular structures hinged or pivoted at one end to appropriate lugs projecting from frame 1, as shown at 50, and having rigidly attached to their outer end the thin plates of metal 51. A score or groove is made in and across the surface of the ice of proper width and depth to receive the lower portions of plates 51, which slide therein and guide the frame and its attached parts in their progress across the ice.

Instead of this device for guiding the machine in its first journey across the ice, we can use strips of metal properly attached to the frame of our machine and set in line with and back of the saws. These strips will project down below the bottom surface of the frame an appropriate distance and engage the sides of the score or cut made by the saws, such engagement preventing lateral movement of the machine and causing it to travel in a straight line. (This arrangement is not shown in the drawings.) In the use of this device the hinged guides will not be used in making the first saw-cut across the ice. The bottom parts of frame 1 contact the ice and act as runners for the machine. The bottom of the runners may be grooved or not, as desired.

What we term an "idler-pulley stand" is also required in the operation of our machine, and in describing it reference is made specifically to Figs. 8, 9, and 10. It consists of approximately-rectangular open side frames, 40, tied and held together by proper tie or distance rods 41, and by other braces or ties, if required. Journaled in the side frames in such manner as to freely rotate therein, and guarded against lateral movement by any well-known mechanical means, is the shaft 42. This shaft has rigidly mounted upon it the rope-sheave 43, over which the cable 33 passes. As the idler-stand is usually placed upon the surface of the ice, some means must be provided to retain it firmly in position thereon. To accomplish this end we provide the front of it with a strip of comparatively thin metal, as shown at 44. This strip extends horizontally across the lower portion of the frame of the device and projects downwardly therefrom an appropriate distance. When the device is located, a score or groove is made in the surface of the ice and the downwardly-projecting part of strip 44 is inserted therein. Strip 44 can also be used as a runner to contact the surface of the ice. In this case no groove or score will be necessary. The weight and pull of the cable have a tendency to overturn the device, and to guard against this we form the back side of the frame of the idler-pulley stand as shown at 45. We also provide a suitable plank, 48, of wood, having a rabbet on one edge, as shown at 46. This plank may be of any suitable length, and is perforated with proper holes for the introduction of the metal pins 47. The plank 48 is suitably located, so that the lip on the frame, as shown at 45, is in engagement with rabbet 46 in plank 48, when the plank is firmly secured to the ice by driving the pins 47 therein.

Having described the construction of our machine, its operation is as follows: A suitable field of ice having been selected, the idler-pully stand is located on one side of it and firmly fastened. Opposite the idler stand and at any suitable distance therefrom is located the motive power used. (In Fig. 7 this is shown to be a steam-engine, but other sources of power can be used, if desirable.) A straight groove or score is then made in the surface of the ice between these two points and the machine shown in Figs. 1 and 2 so located that the hinged guides 49 thereon engage the groove in the ice. If the metal plates located in line with the saws, as previously described, are used, it will not be necessary to make the straight groove or score in the ice, as above mentioned. An appropriate endless cable, 33, is then passed over a proper pulley on the engine-shaft and over and around the various pulleys of the other mechanism, as plainly shown in the drawings. (The cable can enwrap pulley 14 once or more, if desired.) The engine is then set in motion. The motion communicated to the cable by the engine is transmitted to pulley 14 on the main shaft of the machine, and through it and the connecting mechanism the saws are put in rapid rotary motion. Lever 25 is then actuated and the saws let down into the ice until the cut is of proper depth. Lever 38 is then actuated so as to close the gripping-sleeve down upon the cable and in effect attaches the machine shown in Figs. 1 and 2 thereto. As soon as this is done the machine begins to move across the ice, and as the saws are at the same time in rapid motion they cut scores or grooves in the ice as they pass over it. After the machine has traveled across the ice the hinged guides are swung up and out of the score in which they were, the machine moved laterally far enough to admit of placing the hinged guides in one of the scores previously cut by the saws, the motion of the engine is reversed, and the machine travels back across the ice, cutting grooves or scores therein, as before. For permitting our machine to be moved laterally across the ice, we use the device shown in side elevation in Fig. 11. Pins 53 are rigidly inserted in tie-rods 2, Figs. 2 and 11, which engage diagonal slot 54 in runner 55. This runner is so arranged and combined with link 56 and lever 57 that movement of lever 57 into the position shown in dotted lines in Fig. 11 causes runner 55 to take the position shown in dotted lines. This movement causes the bottom edge of runner 55 to project below the bottom of frame 1, Fig. 1, and form a runner, upon which the machine can be laterally moved as far as required. A runner and its actuating mechanism are provided at or near each end of our machine. It will be noticed that a portion of slot 54 is horizontal or parallel with the axis of the tie-rod 2. This shape of the slot takes the weight off lever 57 and link 56 when the runner is in the position shown in dotted lines in Fig. 11. When the machine is properly located, runners 55 are retracted and the machine rests on the bottom surface of frame 1.

The engine and idler-stand are moved laterally when required, when the cycle of operations previously described can be continued indefinitely. It is sometimes the case that snow lies upon the surface of the ice and it becomes desirable to remove it. The curved plates 3 are provided for that purpose. Slots 4 and bolts 5 allow the bottom of the plates to be brought into contact with the surface of the ice and securely held in that position, so that the plates act as a snow-scraper and clean the surface of the ice. Plates 3 can also be used as an ice-plane to remove any poor or snow ice that may lie upon the surface of the ice-field. The plates 3 are suitably perforated to admit the passage through them of the cable 33, and suitable idler-pulleys, 52, Figs. 1 and 2, are provided to prevent chafing of the cable against the side of the apertures in plate 3. If at any time it is desirable to stop the saws and continue the travel of the machine across the ice, as is sometimes the case when the machine is used as a snow-scraper or ice-plane, actuating-lever 20 disengages clutch 15 from pulley 14, and the saws stop while the travel of the machine continues. They (the saws) can be started at any time by reversing the movement of lever 20.

It will be readily seen that ice can be cut or scored in any desired direction by the use of our machine, and at a speed hitherto impossible to attain.

In a machine of the construction herein described many changes will suggest themselves to a skilled mechanic that could be made without departure from the central feature of our invention. Hence we do not limit or confine the broad scope of our invention to the precise specific construction, conformation, or combination of parts hereinbefore described and set forth.

What we claim as new, and desire to secure by Letters Patent, is—

1. In an ice-cutting machine, the combination of a saw-frame movable over the ice, cable-sheaves mounted on said frame, an idler-frame carrying a cable-sheave, a motor provided with a cable-sheave, an endless cable passing over said sheaves, and a grip mounted on the saw-frame and adapted to engage said cable.

2. The combination of a saw-frame movable over the ice, a circular saw journaled in bearings on said frame, cable-sheaves mounted on said frame, an idler-frame carrying a cable-sheave, a motor provided with a cable-sheave, an endless cable passing over said sheaves and adapted to drive the saw, and a grip upon the saw-frame for engaging the said cable.

3. The combination of a saw-frame movable over the ice, a circular saw journaled in bearings in said frame, cable-sheaves mounted on said frame, friction-pulleys engaging each other, one being mounted on the saw-shaft and the other on the shaft carrying one of said sheaves, an idler-frame carrying a cable-sheave, a motor provided with a cable-sheave, an endless cable passing over said sheaves to drive the saw, and a grip upon the saw-frame adapted to engage said cable.

4. In an ice-cutting machine, the combination of cable-sheaves adapted to be located at opposite sides of a field of ice, an endless cable passing over said sheaves and extending across the field, a movable saw-frame, a circular saw mounted in said frame and adapted to be rotated by the endless cable, and a grip mounted on said frame to engage said cable.

5. In an ice-cutting machine, the combination of cable-sheaves adapted to be operated on opposite sides of a field of ice, an endless cable running on sheaves across the field, a movable frame, a circular saw mounted in said frame and adapted to be rotated by the endless cable, the grip upon said frame for engaging the cable, and an ice-scraper upon the frame, substantially as set forth.

In witness whereof we have affixed our signatures in presence of two witnesses.

SEWARD W. BAKER.
PHILIP FRITCH.

Witnesses:
W. G. STONE,
M. E. ROBINSON.